United States Patent
Kim et al.

(10) Patent No.: US 9,077,935 B2
(45) Date of Patent: Jul. 7, 2015

(54) DIGITAL TELEVISION AND METHOD OF DISPLAYING CONTENTS USING THE SAME

(75) Inventors: Hyun Min Kim, Seoul (KR); Jung Han Ryu, Seoul (KR); Kyoung Joung Kim, Seoul (KR); Jeong A Shin, Seoul (KR); Jung Eun Kim, Seoul (KR); Min Su Song, Seoul (KR); Na Ri Lee, Seoul (KR); Kyung Mi Park, Seoul (KR); Byung Soo Kim, Seoul (KR); Yun Mi Park, Seoul (KR)

(73) Assignee: LG Electronics Inc., Seoul (KR)

( * ) Notice: Subject to any disclaimer, the term of this patent is extended or adjusted under 35 U.S.C. 154(b) by 981 days.

(21) Appl. No.: 12/648,427

(22) Filed: Dec. 29, 2009

(65) Prior Publication Data

US 2010/0171765 A1     Jul. 8, 2010

(30) Foreign Application Priority Data

Dec. 29, 2008   (KR) ........................ 10-2008-0135915

(51) Int. Cl.
| | |
|---|---|
| G09G 5/14 | (2006.01) |
| H04N 5/445 | (2011.01) |
| H04N 21/431 | (2011.01) |
| H04N 21/4402 | (2011.01) |
| H04N 21/443 | (2011.01) |
| H04N 21/482 | (2011.01) |
| G06F 3/14 | (2006.01) |

(Continued)

(52) U.S. Cl.
CPC .............. *H04N 5/44591* (2013.01); *G06F 3/14* (2013.01); *H04N 21/42222* (2013.01); *H04N 21/4316* (2013.01); *H04N 21/4345* (2013.01); *H04N 21/440263* (2013.01); *H04N 21/4438* (2013.01); *H04N 21/482* (2013.01)

(58) Field of Classification Search
CPC ......................................................... G06F 3/14
USPC ....................................................... 345/672
See application file for complete search history.

(56) References Cited

U.S. PATENT DOCUMENTS

| | | | | |
|---|---|---|---|---|
| 5,132,809 A | * | 7/1992 | Kikuchi et al. ................ | 358/403 |
| 5,745,101 A | * | 4/1998 | Yamamoto et al. ............ | 345/573 |
| 5,818,434 A | * | 10/1998 | Yamamoto et al. ........... | 345/565 |

(Continued)

FOREIGN PATENT DOCUMENTS

| | | |
|---|---|---|
| JP | 2008192013 A | 8/2008 |
| KR | 10-0405617 U | 11/2003 |

(Continued)

OTHER PUBLICATIONS

How to Use Extended Desktop View in Windows XP) Service Pack 2 (SP2) was released on Aug. 25, 2004.*

(Continued)

*Primary Examiner* — Javid A Amini
(74) *Attorney, Agent, or Firm* — Fish & Richardson P.C.

(57) ABSTRACT

A DTV and a method of displaying content using the same are provided. The DTV includes: a plurality of display units physically isolated from each other; and a control unit configured to, if a predetermined first event has occurred, move a content displayed on the first display unit among the plurality of display units and display the content on the second display unit among the plurality of display units, wherein the control unit is configured to control the display of the content such that the movement process of the content is visually recognized.

19 Claims, 8 Drawing Sheets

(51) Int. Cl.
*H04N 21/422* (2011.01)
*H04N 21/434* (2011.01)

(56) References Cited

U.S. PATENT DOCUMENTS

| | | | |
|---|---|---|---|
| 5,986,622 A * | 11/1999 | Ong | 345/1.1 |
| 6,456,339 B1 * | 9/2002 | Surati et al. | 348/745 |
| 6,611,241 B1 * | 8/2003 | Firester et al. | 345/1.3 |
| 6,814,448 B2 * | 11/2004 | Ioka | 353/69 |
| 6,839,071 B1 * | 1/2005 | Miyamoto | 715/788 |
| 6,842,748 B1 * | 1/2005 | Warner et al. | 1/1 |
| 7,167,823 B2 * | 1/2007 | Endo et al. | 704/7 |
| 7,389,252 B2 * | 6/2008 | Robb et al. | 705/14.73 |
| 7,924,297 B2 * | 4/2011 | Morikawa et al. | 345/660 |
| 8,648,882 B2 * | 2/2014 | Tsukagoshi | 345/672 |
| 2002/0030674 A1 * | 3/2002 | Shigeta | 345/204 |
| 2002/0167503 A1 * | 11/2002 | Tsunoda et al. | 345/204 |
| 2003/0115263 A1 * | 6/2003 | Tran et al. | 709/203 |
| 2003/0227468 A1 * | 12/2003 | Takeda | 345/619 |
| 2005/0083642 A1 * | 4/2005 | Senpuku et al. | 361/681 |
| 2005/0117126 A1 * | 6/2005 | Miyazawa et al. | 353/94 |
| 2005/0223333 A1 * | 10/2005 | Yamamoto et al. | 715/765 |
| 2005/0289117 A1 * | 12/2005 | Hiraishi et al. | 707/2 |
| 2006/0048069 A1 * | 3/2006 | Igeta | 715/769 |
| 2006/0193536 A1 * | 8/2006 | Pilu | 382/298 |
| 2006/0253874 A1 * | 11/2006 | Stark et al. | 725/62 |
| 2007/0120763 A1 * | 5/2007 | De Paepe et al. | 345/1.3 |
| 2007/0168353 A1 * | 7/2007 | Jang | 707/10 |
| 2007/0174079 A1 * | 7/2007 | Kraus | 705/1 |
| 2007/0230901 A1 * | 10/2007 | Shimotashiro et al. | 386/83 |
| 2008/0177994 A1 * | 7/2008 | Mayer | 713/2 |
| 2008/0189649 A1 * | 8/2008 | Kikuchi | 715/781 |
| 2009/0064021 A1 * | 3/2009 | Boettcher et al. | 715/766 |
| 2009/0100462 A1 * | 4/2009 | Park et al. | 725/38 |
| 2009/0109338 A1 * | 4/2009 | Furutani | 348/565 |
| 2009/0160731 A1 * | 6/2009 | Schuler et al. | 345/1.1 |
| 2009/0207184 A1 * | 8/2009 | Laine et al. | 345/619 |
| 2009/0228841 A1 * | 9/2009 | Hildreth | 715/863 |
| 2009/0285547 A2 * | 11/2009 | Ichihashi et al. | 386/83 |
| 2010/0060547 A1 * | 3/2010 | Bloebaum et al. | 345/1.3 |
| 2010/0082784 A1 * | 4/2010 | Rosenblatt et al. | 709/222 |
| 2010/0095204 A1 * | 4/2010 | Kobayashi | 715/700 |
| 2010/0119175 A1 * | 5/2010 | Tsang | 382/294 |
| 2010/0245345 A1 * | 9/2010 | Tomisawa et al. | 345/419 |
| 2010/0309224 A1 * | 12/2010 | Yamamoto et al. | 345/629 |
| 2011/0023077 A1 * | 1/2011 | Simon | 725/134 |
| 2011/0235992 A1 * | 9/2011 | Mihara | 386/239 |
| 2011/0283334 A1 * | 11/2011 | Choi et al. | 725/148 |
| 2012/0069055 A1 * | 3/2012 | Otsuki et al. | 345/681 |

FOREIGN PATENT DOCUMENTS

| | | |
|---|---|---|
| KR | 10-0514817 B1 | 9/2005 |
| KR | 10-0577363 B1 | 5/2006 |
| WO | WO 2007029997 A1 * | 3/2007 |

OTHER PUBLICATIONS

CHI 2006 Proceedings • Multidisplay Environments Apr. 22-27, 2006 • Montréal, Québec, Canada.*
International Search Report & Written Opinion issued in Application No. PCT/KR2009/007814, mailed Aug. 9, 2010, 8 pages.

* cited by examiner

DIGITAL TELEVISION AND METHOD OF DISPLAYING CONTENTS USING THE SAME

This nonprovisional application claims priority under 35 U.S.C. §119(a) on Patent Application No. 10-2008-0135915 filed in Republic of Korea on Dec. 29, 2008 the entire contents of which are hereby incorporated by reference.

BACKGROUND

1. Field

This document relates to a digital television (DTV), and more particularly, to a DTV for displaying contents in a new manner, and a method of displaying contents using the same.

2. Related Art

Recently, a digital television (DTV) capable of outputting high definition video and high quality sound is widely spread and commercially available. Moreover, an internet protocol television (IPTV), which is a kind of DTV, which can be connected to the internet is to be distributed.

In recent years, electronic equipment tend to focus on satisfying the demands of users with individual needs, shifting focus away from delivering advancements and improvements in terms of design. Thus, there are being built production and sales systems, which take individual preferences, such as customized manufactured products and the diversification of user options, into account. Moreover, there is a trend toward the development of user-oriented interfaces which allow the equipment itself to adjust the use environment according to user preferences.

Owing to the recent rapid progress of the terminal technology and the communication technology, it is made possible to provide a variety of contents through a DTV. Hence, there is an urgent need for the provision of an interface capable of displaying contents provided through a DTV in various manners.

SUMMARY

An aspect of this document is to provide a DTV, which is capable of displaying a variety of contents provided through the DTV in a new manner different from the conventional one, and a method of displaying contents using the same.

In one aspect of the present invention, there is provided a DTV including: a plurality of display units physically isolated from each other; and a control unit configured to, if a predetermined first event has occurred, move a content displayed on the first display unit among the plurality of display units and display the content on the second display unit among the plurality of display units, wherein the control unit is configured to control the display of the content such that the movement process of the content is visually recognized.

In another aspect of the present invention, there is provided a method of displaying contents using a DTV, which displays contents on the DTV including a first display unit and a second display unit physically isolated from each other, the method including: displaying a content on the first display unit; and if a predetermined first event has occurred, moving the content to the second display unit such that the movement process of the content is visually recognized.

The DTV and the method of displaying contents using the same according to the present invention can give a new impression to a user by providing a new contents display method, and allows contents to be smoothly moved between a plurality of display units equipped in the DTV without an interruption.

BRIEF DESCRIPTION OF THE DRAWINGS

The implementation of this document will be described in detail with reference to the following drawings in which like numerals refer to like elements.

DETAILED DESCRIPTION

Figure 1:
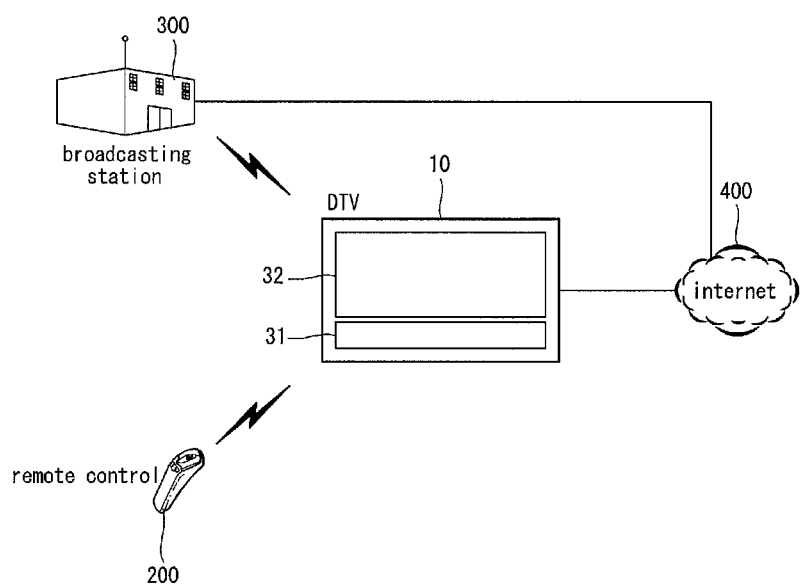
FIG. 1 is a view schematically illustrating a system to which the present invention is applied.

The above-mentioned objects, features, and advantages will be more apparent by the following detailed description associated with the accompanying drawings. Hereinafter, preferred embodiments of the present invention will be set forth in detail with reference to the accompanying drawings. Throughout the specification, the same reference numerals represent the same components. Further, in the following description, well-known functions or constructions related to the present invention will not be described in detail if it appears that they could obscure the invention in unnecessary detail.

Although a suffix "module" or "unit" is used for constituent elements described in the following description, it is intended only for easy description of the specification. The suffix itself has no meaning or function to distinguish the constituent element using the suffix from the constituent element using no suffix.

FIG. 1 is a view schematically illustrating a system to which the present invention is applied. As illustrated in FIG. 1, the system may comprise a DTV 10, a remote control 200, a broadcasting station 300, and the internet 400.

The remote control 200 may be a 3-dimensional (3D) pointing device. The 3D pointing device may sense a 3D motion to transmit information about the sensed 3D motion to the DTV 10. The 3D motion may correspond to a command for controlling the DTV 10. A user can transmit a predetermined command to the DTV 10 by moving the 3D pointing device in a space. The 3D pointing device may be provided with various key buttons. The user can enter various commands by the key buttons.

The DTV 10 can receive a broadcast signal from the broadcasting station 300 and output it. Moreover, the DTV 10 may be provided with a device capable of connecting to the internet 400 through transmission/control protocol/internet protocol (TCP/IP).

Figure 2:
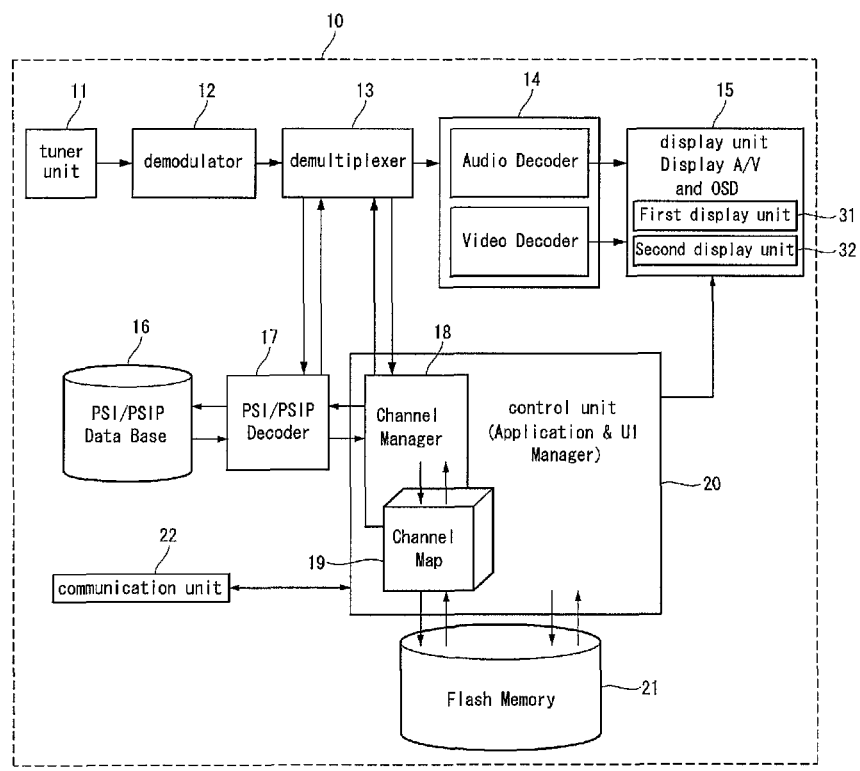
FIG. 2 is a block diagram of a DTV according to an exemplary embodiment of the present invention.

FIG. 2 is a block diagram of a DTV according to an exemplary embodiment of the present invention.

The DTV according to the exemplary embodiment of the present invention may comprise a tuner unit 11, a demodulator 12, a demultiplexer 13, an audio/video decoder 14, display unit 15, a program and system information/program and system information protocol (PSI/PSIP) database 16, a PSI/PSIP decoder 17, a channel manager 18, a channel map 19, a control unit 20, a flash memory 21, and a communication unit 22.

The tuner unit 11 may receive a digital broadcast signal containing a PSI/PSIP table. The operation of the tuner unit 11 may be controlled by the channel manager 18. Thus, the tuner unit 11 records the result of the received digital broadcast signal in the channel manager 18. The tuner unit 11 may be capable of multichannel reception because it is equipped with a plurality of tuners.

The demodulator 12 functions to receive the signal tuned by the tuner unit 11 and demodulate it into a VSB/EVSB (Vestigial Side Band/Enhanced Vestigial Side Band) signal.

The demultiplexer 13 demultiplexes received transport packets demodulated by the demodulator 12 to audio, video and PSI/PSIP table data.

The demultiplexing of the PSI/PSIP table data can be controlled by the PSI/PSIP decoder 17. The demultiplexing of the audio and video data can be controlled by the channel manager 18.

When the PSI/PSIP decoder 17 sets a packet identifier (PID) for a desired table as a condition, the demultiplexer 13 filters the sections of the PSI/PSIP table for satisfying the PID and transmits the sections to the PSI/PSIP decoder 17. When the channel manager 18 sets an A/V PID of a corresponding virtual channel as a condition, the demultiplexer 13 demultiplexes an A/V elementary stream (ES) and transmits the demultiplexed A/V ES to the A/V decoder 14. The A/V decoder 14 decodes the received broadcast data according to a corresponding encoding method.

The PSI/PSIP decoder 17 performs parsing of the PSI/PSIP section, reads the remaining actual section data which has not been section-filtered by the demultiplexer 13, and records the read data in the PSI/PSIP database 16.

The channel manager 18 may request the reception of a channel-related information table by referring to the channel map 19 and receive the result. At this time, the PSI/PSIP decoder 17 controls the demultiplexing of the channel-related information table and transmits a list of A/V PIDs to the channel manager 18.

The channel manager 18 may directly control the demultiplexer 13 using the received A/V PID to control the A/V decoder 14.

The control unit 20 may control a graphical user interface (GUI) for displaying the state of the receiver system with an on-screen display (OSD).

Also, the control unit 20 controls the above components, and controls the overall operation of the DTV 10.

The display unit 15 implements the broadcast data output from the A/V decoder 14 in audio and video. The display unit 15 may comprises a plurality of display units which are isolated from each other physically or logically. In this specification, it is assumed that the display unit 15 comprises a first display unit 31 and a second display unit 32. The display unit 15 may comprise three or more physical display units.

The first display unit 31 and the second display unit 32 may be identical or different in size and/or resolution.

At least one of the first display unit 31 and the second display unit 32 may receive broadcast data and output it, and may be equipped with all display functions of a typical DTV.

At least one of the first display unit 31 and the second display unit 32 can display data broadcasts, text broadcasts, subtitles, advertisements, etc that are separated from the broadcast data or separately received. Moreover, at least one of the first display unit 31 and the second display unit 32 can display additional information, such as stock information, weather information, etc, an instant message window, and so on. Furthermore, at least one of the first display unit 31 and the second display unit 32 may have no audio function. In addition, the first display unit 13 and the second display unit 32 may independently receive power to be driven independently from each other by a control signal output from the control unit 20.

The communication unit 22 may perform communication with the remote control 200. For instance, the communication unit 22 and the remote control 200 may perform communication by an RF communication method or an infrared communication method. A communication method between the remote control 200 and the DTV 10 is not limited to any particular method.

Figure 3:
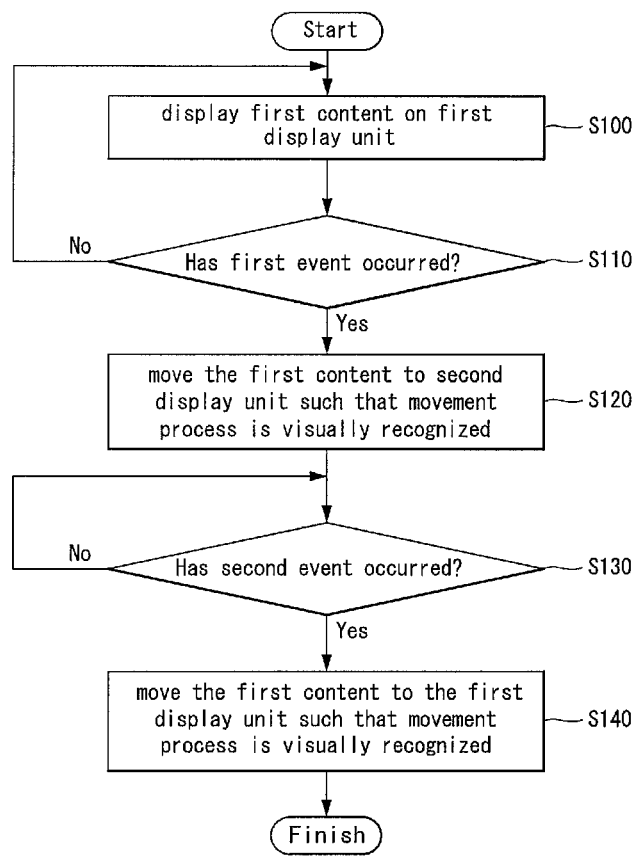
FIG. 3 is a flowchart of a method of displaying contents using a DTV according to an exemplary embodiment of the present invention.

FIG. 3 is a flowchart of a method of displaying contents using a DTV according to an exemplary embodiment of the present invention. The method of displaying contents using a DTV according to the exemplary embodiment of the present invention can be implemented by the DTV 10 described with reference to FIGS. 1 and 2. Now, referring to FIG. 3 and required drawings, the method of displaying contents using a DTV according to the exemplary embodiment of the present invention and the operation of the DTV 10 for implementing this method will be described in detail.

The control unit 20 displays a first content on the first display unit 31 [S100]. Here, the control unit 20 may display a second content, different from the first content, on the second display unit 31.

The contents mentioned in the present invention may include still images, motion images, text, and objects. For instance, the contents may be icons, photographs, or broadcasts.

Figure 4:
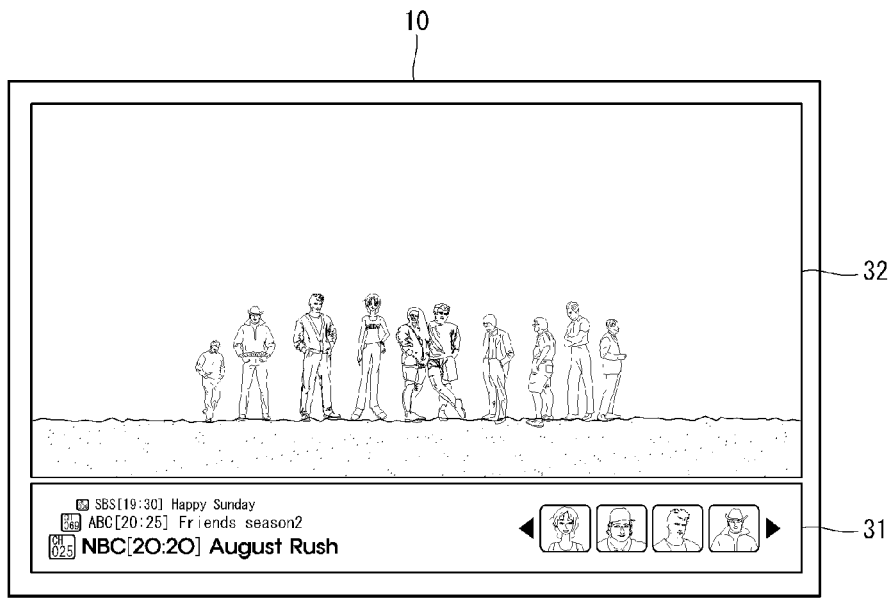
FIG. 4 is a view illustrating an example of a screen which displays at least one content on each of first and second display units.

FIG. 4 illustrates an example of a screen which displays at least one content on each of the first and second display units. Referring to FIG. 4, the first display unit 31 displays a plurality of contents, and the second display unit 32 displays one content. It is needless to say that FIG. 4 is only an illustration and the present invention is not limited thereto.

The control unit 20 determines whether or not a predetermined first event has occurred [S110]. If the first event has occurred, the control unit 20 moves the first content displayed on the first display unit 31 and displays it on the second display unit 32 [S120]. Here, the control unit 20 can control the display of the first content such that the movement process of the first content is visually recognized.

The first event may be variously set. For example, the first event may be the selection of the first content. Moreover, for example, the first event may be the arrival of a predetermined point in time, such as an alarm time and the start time of a preferred broadcast program.

Hereinafter, various exemplary embodiments where the control unit 20 controls the display of the first content such that a user visually recognizes the movement process of the first content.

The control unit 20 can control the display of the first content to allow the user to visually recognize the movement path of the first content.

Figure 5:
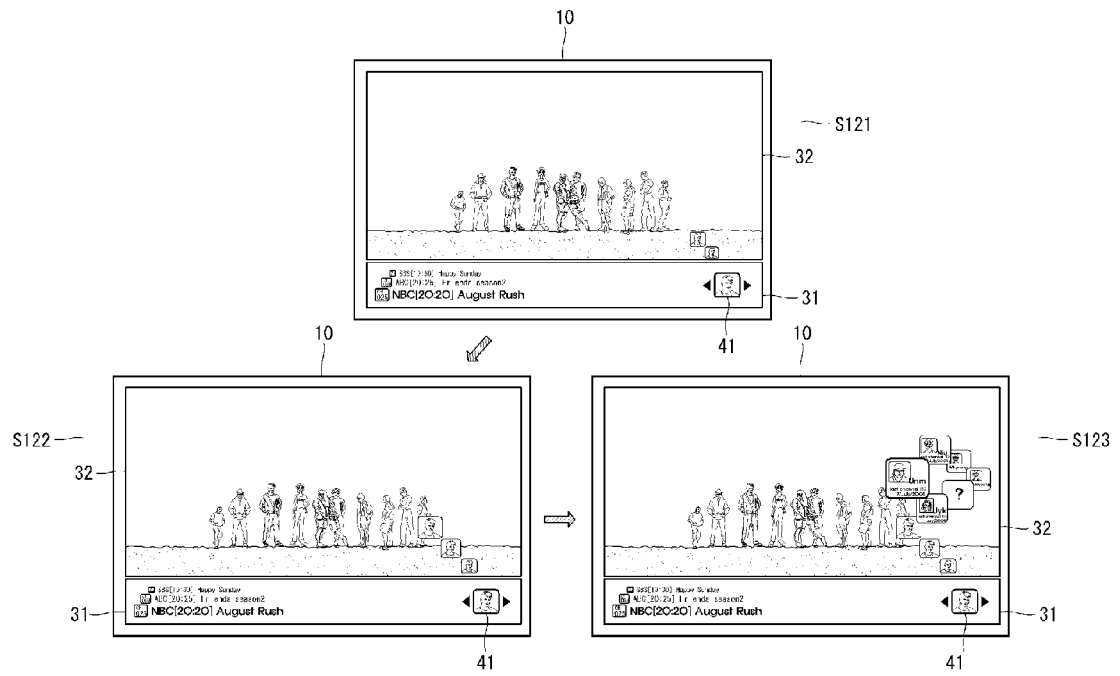
FIGS. 5 and 6 are views illustrating various examples of a movement path of a first content.
Figure 6:
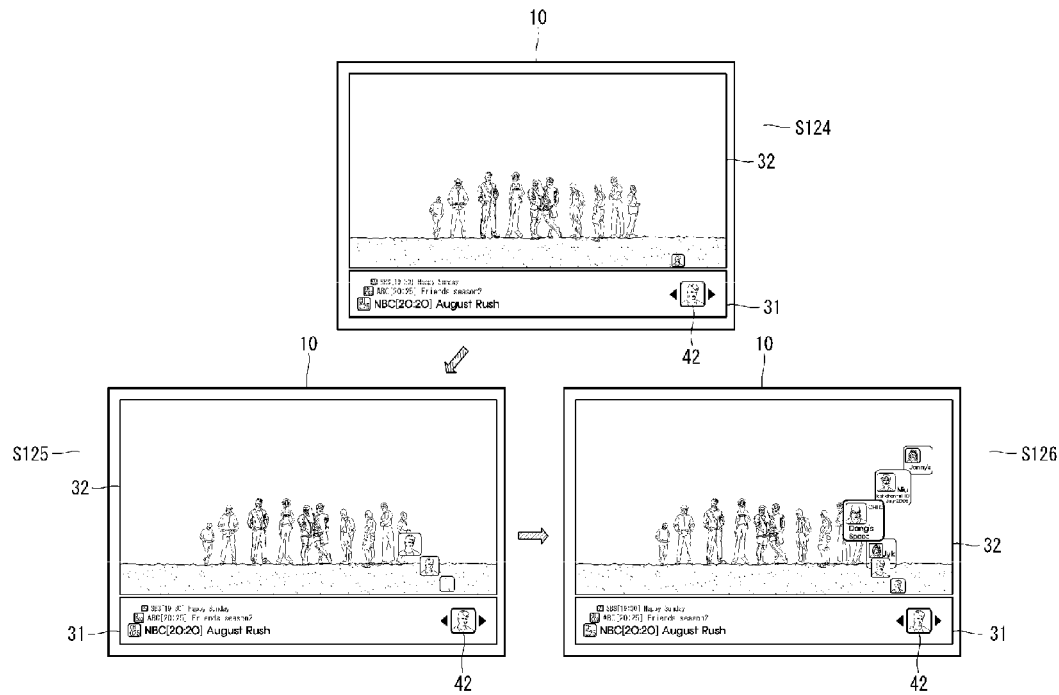
Figure 7A:
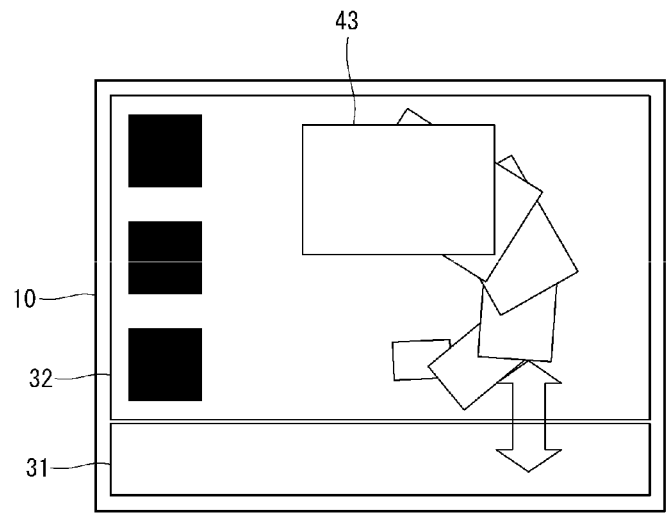
FIGS. 7a to 7d are views illustrating other examples of the movement path of the first content.
Figure 7B:
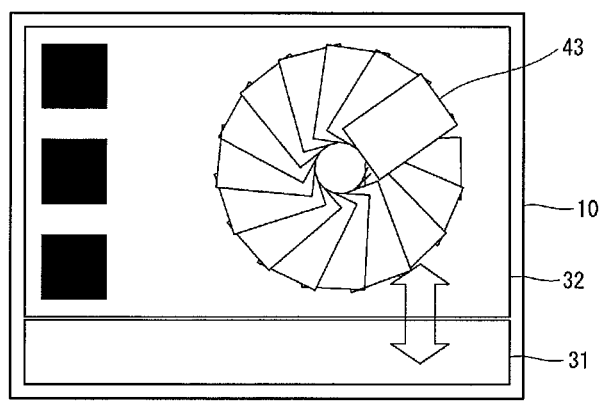
Figure 7C:
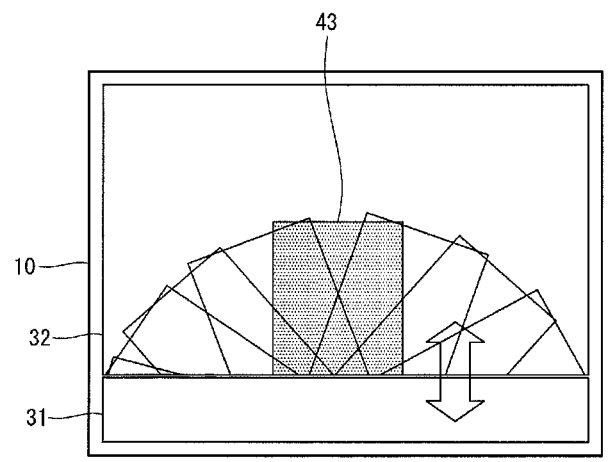
Figure 7D:
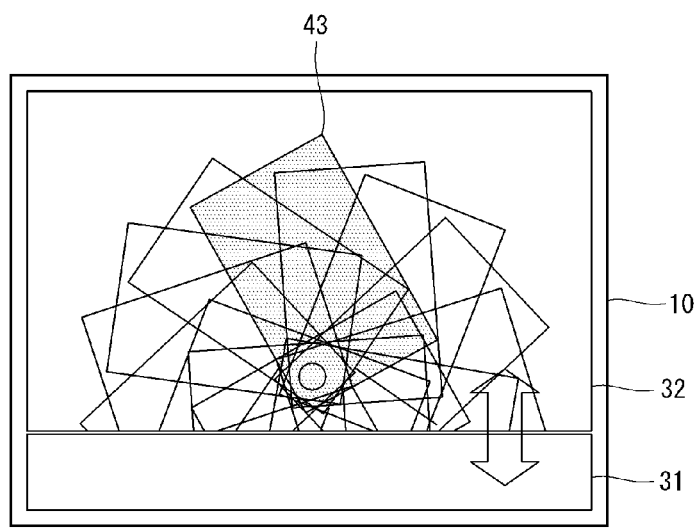

The movement path of the first content 20 can be variously set. FIGS. 5 and 6 illustrate various examples of a movement path of the first content. For instance, referring to FIG. 5, the first content 41 may be moved from the first display unit 31 to the second display unit 32 according to the occurrence of the first event. At this time, as shown in S121, S122, and S123 of FIG. 5, the user can visually recognize the movement process including the movement path of the first content 41. Moreover, for instance, referring to FIG. 6, the first content 42 can be moved from the first display unit 31 to the second display unit 32 such that the movement process including the movement path is visually recognized as shown in S124, S125, and S126. FIGS. 7a to 7d are views illustrating other examples of the movement path of the first content 43.

The movement path of the first content can vary according to at least one of the type of the first event, the type of the first content, and the settings of the user. For example, if the first event is the selection of the first content, the control unit 20 can move the first content from the first display unit 31 to the second display unit 32 via the movement path shown in FIG. 5. Moreover, for example, if the first content is an icon, the control unit 20 can move the first content from the first display unit 31 to the second display unit 32 via the movement path shown in FIG. 6.

The first display unit 31 and the second display unit 32 may differ from each other in at least one of size and resolution. When moving the first content between the first display unit 31 and the second display unit 32, the control unit 20 can control the size of the first content by considering the resolution of the display unit to which the first content is to be moved.

The control unit 20 can gradually change the size of the first content during the movement of the first content by considering the resolution of the first display unit 31 or the second display unit 32.

Figure 8:
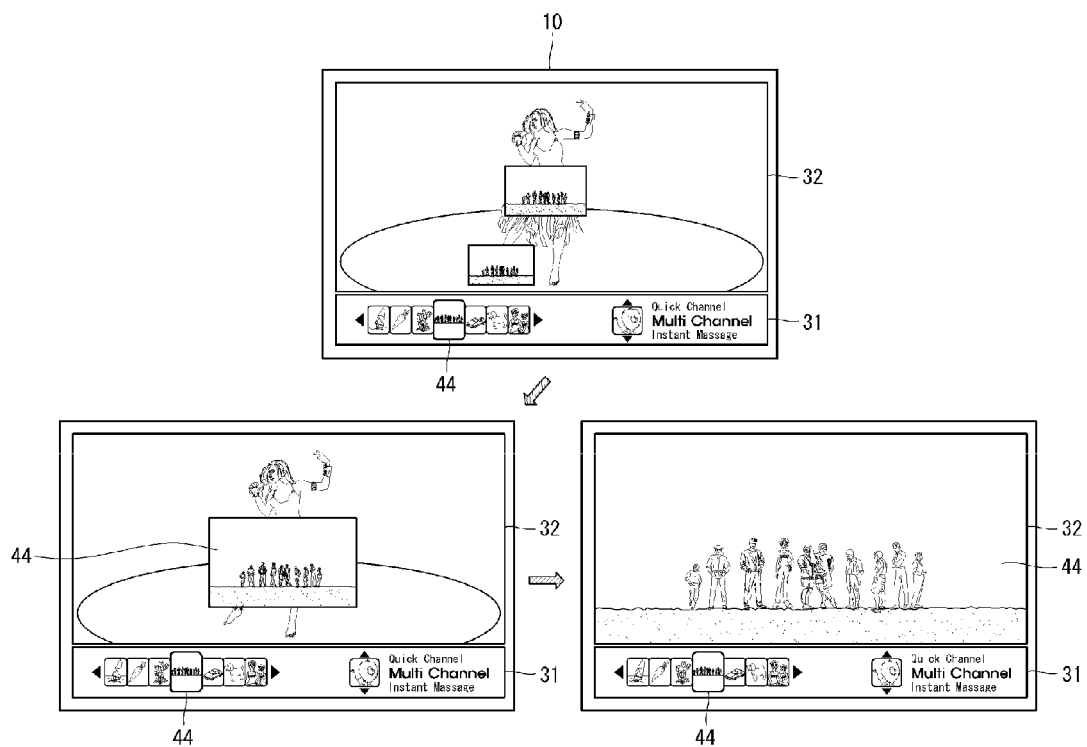
FIG. 8 is a view illustrating an example in which the size of the first content changes during the movement from the first display unit to the second display unit.
Figure 9:
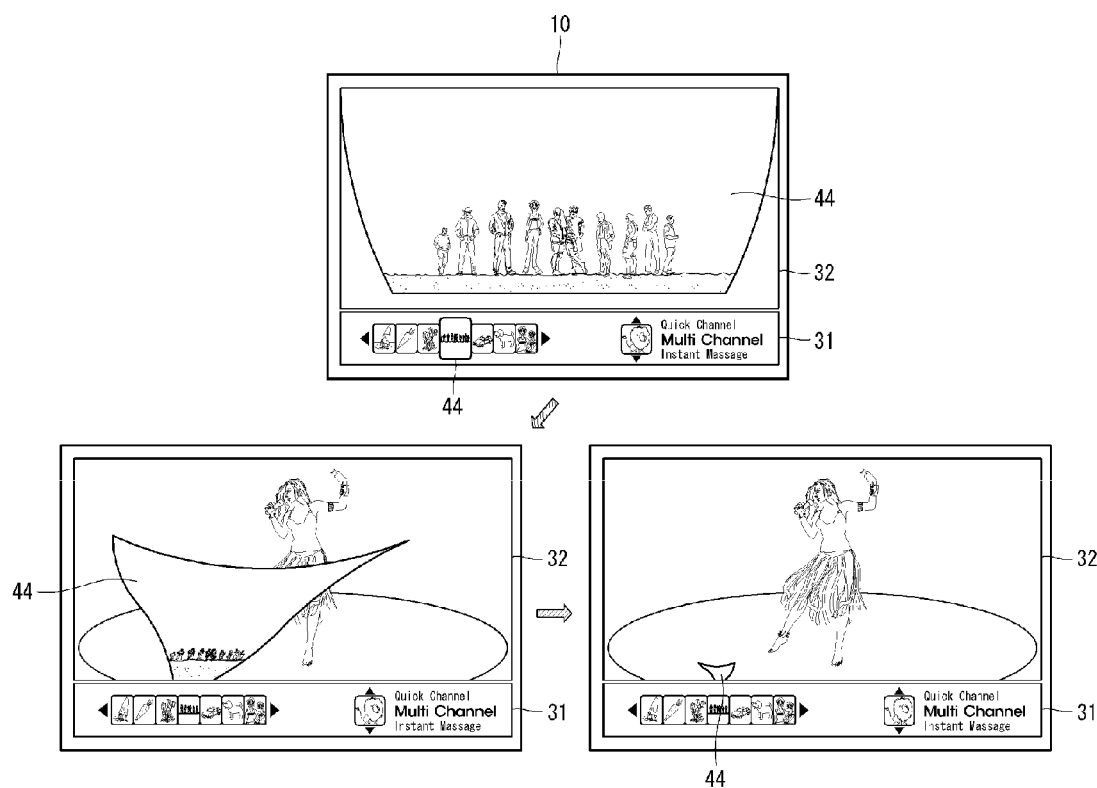
FIG. 9 is a view illustrating an example in which the size of the first content changes during the movement from the second display unit to the first display unit.

FIG. 8 is a view illustrating an example in which the size of the first content 44 changes during the movement from the first display unit 31 to the second display unit 32. FIG. 9 is a view illustrating an example in which the size of the first content 44 changes during the movement from the second display unit 32 to the first display unit 31.

The control unit 20 can move the first content from the first display unit 31 to the second display unit 32 without a change in the size of the first content, and then the second display unit 32 can gradually change the size of the first content by considering the resolution of the second display unit 32.

In performing the step S120, the control unit 20 can display the first content on both of the first display unit 31 and the second display unit 32. Alternatively, the control unit 20 may not display the first content on the first display unit 31 at a certain point in time during the movement of the first content from the first display unit 31 to the second display unit 32 or after completion of the movement.

Also, if the first content is displayed on both of the first display unit 31 and the second display unit 32, the control unit 20 can display detailed information of the first content on any one of the first display unit 31 and the second display unit 32 and brief information of the first content on the other one.

For instance, the control unit 20 can display images of a broadcast program received through a specific broadcast channel and/or detailed information of the broadcast program on the second display unit 32, and display brief information, such as the title of the broadcast program, on the first display unit 31.

The control unit 20 can control such that the first display unit 31 is turned off after the first content is moved to the second display unit 32. If the first content is moved to the second display unit 32, the first display unit 31 is turned off, thus preventing waste of power consumption.

After performing the step S120, the control unit 20 determines whether or not a predetermined second event has occurred [S130]. If the second event has occurred, the first content displayed on the second display unit 32 is moved and displayed onto the first display unit 31 [S140]. Here, the control unit 20 can control the display of the first content such that the movement process of the first content is visually recognized like in the step S120.

Like the first event, the second event, too, can be variously set. Moreover, the step S140 can have the technical characteristics similar to those of the step S120 except that the moving direction of the first content in the step S140 is different from that of the step S120.

In performing the step S140, if the first display unit 31 is turned off, the control unit 20 can turn on the first display unit 31 and move the first content to the first display unit 32.

Moreover, in performing the step S140, the control unit 20 can turn off the second display unit 32 at a point of time when the movement of the first content is completed.

The above-described method of displaying contents using the DTV according to the present invention may be provided as a program that causes a computer to execute the method. The program may be recorded and provided on a computer readable recording medium.

The method of displaying contents using the DTV according to the present invention can be implemented in software. When implemented in software, the elements of the invention are essentially the code segments to perform the necessary tasks. The program or code segments can be stored in a processor readable medium or transmitted by a computer data signal embodied in a carrier wave over a transmission medium or communication link.

The computer-readable recording medium includes any type of storage device that can store data readable by a computer system. Examples of the computer-readable recording medium include a ROM, RAM, CD-ROM, DVD-ROM, DVD-RAM, magnetic tape, floppy disk, hard disk, and optical data storage. The computer-readable recording medium can also be distributed over a network of connected computer systems such that the computer-readable code is stored and executed in a distributed fashion.

The present invention described above is not limited to the aforementioned exemplary embodiments and the accompanying drawings. It will be apparent that those skilled in the art can make various substitutions, modifications and changes thereto without departing from the technical spirit of the present invention. Further, the exemplary embodiments described in this document are not limitative, and all or some of the embodiments may be selectively combined so that they can be modified in various manners.

What is claimed is:
1. A DTV comprising:
a display unit including a plurality of display areas; and
a control unit configured to:
cause the display unit to display at least one content related to broadcast programs on a first display area among the plurality of display areas,
receive a predetermined first event,
move, from the first display area to a second display area among the plurality of display areas, the specific content corresponding to broadcasting content, and
cause the display unit to display the specific content by gradually changing a size of the specific content on the second display area.
2. The DTV of claim 1, wherein the control unit is configured to control the display of the specific content by moving the specific content based on a set movement path on the second display area, the set movement path corresponding to a type of the specific content.
3. The DTV of claim 1, wherein the first display area and the second display area differ from each other in size, and when displaying the specific content on the second display area, the control unit is configured to control the size of the content by considering a resolution of the second display area.

4. The DTV of claim 1, wherein the control unit is configured to control the display of the content such that the movement process of the content from the first display area to the second display area is visually recognized and wherein the movement process of the content includes gradually changing a size of the content during the movement of the content by considering the resolution of the second display area according to steps of the movement process.

5. The DTV of claim 1, wherein the control unit is configured to control the display of the content such that the movement process of the content from the first display area to the second display area is visually recognized and wherein the movement process of the content includes gradually changing a size of the content during the movement of the content by considering the resolution of the second display area after moving the content to the second display area without a change in size according to the steps of the movement process.

6. The DTV of claim 1, wherein the control unit is configured to display the content on both of the first display area and the second display area.

7. The DTV of claim 6, wherein the control unit is configured to display detailed information of the content on any one of the first display area and the second display area and brief information of the content on the other one.

8. The DTV of claim 1, wherein the control unit is configured not to display the content on the first display area after the movement of the content.

9. The DTV of claim 1, wherein the control unit is configured to turn off the first display area after the movement of the content.

10. The DTV of claim 9, wherein, if a predetermined second event has occurred, the control unit is configured to turn on the first display area and move the content to the first display area.

11. The DTV of claim 1, wherein the first event includes selection of the content and arrival of a predetermined point in time.

12. A method of displaying contents using a DTV, which displays contents using the DTV comprising a display unit including a first display area and a second display area, the method comprising:
   causing the display unit to display at least one content related to broadcast programs on the first display area;
   receiving a predetermined first event;
   moving, from the first display area to the second display area, the specific content corresponding to broadcasting content; and
   causing the display unit to display the specific content by gradually changing a size of the specific content on the second display area.

13. The method of claim 12, wherein causing the display unit to display the specific content comprises moving the specific content based on a set movement path on the second display area, the set movement path corresponding to a type of the specific content.

14. The method of claim 12, wherein causing the display unit to display the specific content comprises gradually changing a size of the specific content by considering the resolution of the second display area.

15. The method of claim 12, wherein causing the display unit to display the specific content comprises gradually changing a size of the specific content by considering the resolution of the second display area after moving the specific content to the second display area without a change in size according to steps of the movement process.

16. The method of claim 12, further comprising maintaining the display of the content on the first display area.

17. The method of claim 12, further comprising deleting the content from the first display area after the movement of the content.

18. The method of claim 12, further comprising turning off the first display area after the movement of the content.

19. The DTV of claim 1, wherein the first predetermined event comprises arrival of a time for broadcasting a specific content of the at least one content or receipt of an input, by a user, for selecting a specific content of the at least one content.

* * * * *